US012196016B2

(12) United States Patent
Guerin et al.

(10) Patent No.: US 12,196,016 B2
(45) Date of Patent: Jan. 14, 2025

(54) HANDLE FOR A DOOR LEAF FOR A MOTOR VEHICLE

(71) Applicant: U-Shin Italia S.p.A., Pianezza (IT)

(72) Inventors: Anthony Guerin, Pianezza (IT); Guillaume Despreaux, Pianezza (IT)

(73) Assignee: U-Shin Italia S.p.A., Pianezza (IT)

( * ) Notice: Subject to any disclaimer, the term of this patent is extended or adjusted under 35 U.S.C. 154(b) by 82 days.

(21) Appl. No.: 17/473,010

(22) Filed: Sep. 13, 2021

(65) Prior Publication Data

US 2021/0404226 A1 Dec. 30, 2021

Related U.S. Application Data

(63) Continuation of application No. PCT/EP2020/053154, filed on Feb. 7, 2020.

(30) Foreign Application Priority Data

Mar. 12, 2019 (FR) ..................................... 19/02519

(51) Int. Cl.
*E05B 81/76* (2014.01)
*E05B 85/10* (2014.01)

(52) U.S. Cl.
CPC ............ *E05B 85/103* (2013.01); *E05B 81/77* (2013.01); *E05B 85/107* (2013.01)

(58) Field of Classification Search
CPC ...... E05B 85/103; E05B 85/107; E05B 85/16; E05B 81/77; E05B 85/10; Y10S 292/31
See application file for complete search history.

(56) References Cited

U.S. PATENT DOCUMENTS 3,398,484 A * 8/1968 Katsumura ........... E05F 15/622 49/281
4,644,693 A * 2/1987 Wang .................... E05F 15/619 49/358

(Continued)

FOREIGN PATENT DOCUMENTS

DE 69007242 7/1994
DE 102010056437 A1 * 6/2012 ............. E05B 77/06

(Continued)

OTHER PUBLICATIONS

English translation of Office Action issued in corresponding JP Application 2021-554769, issued Dec. 15, 2023, 3 pages.

(Continued)

*Primary Examiner* — Carlos Lugo
(74) *Attorney, Agent, or Firm* — Burris Law, PLLC

(57) ABSTRACT

A handle of a door leaf for a motor vehicle includes a gripping element and a detection device. The gripping element includes an external surface facing outside of a vehicle passenger compartment and an internal surface facing inside of the vehicle passenger compartment. The gripping element is movable relative to a support and fixed to at least one lever configured to displace the gripping element. The gripping element is flush with the door leaf in a closed position. The detection device is configured to detect a predetermined pressure exerted on the gripping element and to send, when such predetermined pressure is detected, an opening signal of the door leaf to an opening (Continued)

device configured to open the door leaf. The detection device is disposed relative to the gripping element on the internal surface of the gripping element.

7 Claims, 3 Drawing Sheets

(56) References Cited

U.S. PATENT DOCUMENTS

| | | | | |
|---|---|---|---|---|
| 5,123,687 | A * | 6/1992 | Pfeiffer | E05B 1/0092 292/DIG. 31 |
| 6,072,403 | A * | 6/2000 | Iwasaki | G07C 9/00309 340/5.72 |
| 8,342,583 | B2 * | 1/2013 | Stauffer | E05B 85/14 292/336.3 |
| 8,505,241 | B2 * | 8/2013 | Kusunoki | E05F 15/646 296/146.4 |
| 9,605,452 | B2 * | 3/2017 | Yoshino | E05B 85/107 |
| 10,435,926 | B2 * | 10/2019 | Brown | E05B 85/103 |
| 10,487,547 | B2 * | 11/2019 | Malvy | E05B 81/06 |
| 10,633,893 | B2 * | 4/2020 | Harajli | E05B 81/20 |
| 11,008,797 | B2 * | 5/2021 | Termine | E05F 15/622 |
| 2004/0135380 | A1 | 7/2004 | Bruderick et al. | |
| 2012/0280520 | A1 | 11/2012 | Wellborn, Sr. et al. | |
| 2017/0306662 | A1 | 10/2017 | Och et al. | |
| 2019/0292818 | A1 * | 9/2019 | Cumbo | E05C 17/003 |
| 2020/0263459 | A1 * | 8/2020 | Debroucke | E05B 81/20 |

FOREIGN PATENT DOCUMENTS

| | | | | |
|---|---|---|---|---|
| DE | 202014009319 | U1 * | 3/2015 | E05B 85/103 |
| DE | 102015113903 | | 2/2017 | |
| DE | 102016112689 | A1 * | 1/2018 | E05B 81/76 |
| DE | 102017126090 | | 6/2018 | |
| EP | 3103946 | | 12/2016 | |
| FR | 2958962 | | 10/2011 | |
| FR | 3071861 | A1 * | 4/2019 | E05B 77/34 |
| JP | 2007182748 | A | 7/2007 | |
| JP | 2007321470 | A | 12/2007 | |

OTHER PUBLICATIONS

International Search Report for International Application PCT/EP2020/053154, mailed Mar. 5, 2020.

* cited by examiner

HANDLE FOR A DOOR LEAF FOR A MOTOR VEHICLE

CROSS-REFERENCE TO RELATED APPLICATIONS

This application is a continuation of International Application No. PCT/EP2020/053154, filed on Feb. 7, 2020, which claims priority to and the benefit of FR 19/02519, filed on Mar. 12, 2019. The disclosures of the above applications are incorporated herein by reference.

FIELD

The present disclosure relates to door leaf handles for a motor vehicle, and more particularly to handles flush with the door leaf of a motor vehicle.

BACKGROUND

The statements in this section merely provide background information related to the present disclosure and may not constitute prior art.

A type of motor vehicle door leaf is known which does not have a mechanical door handle, the handle is replaced by an electric opening device. The electric opening device of the door leaf can be controlled by a contactless interface or by an interface of the tactile type with a capacitive or inductive sensor, for example, to allow the user to control the opening of the door leaf.

In addition, to compensate for the lack of a mechanical handle and therefore of a gripping element allowing the opening of the door leaf, the door leaf is equipped with a motorized opening system, or ejection system, which is designed to drive the door leaf from a closed position, in which the door leaf is flush with the peripheral frame formed by the vehicle body, to a partial opening position to allow a user to grip the edge of the door leaf in order to completely open the door leaf.

Various opening systems are known, in particular a system which includes a rack secured to the framework of the vehicle and an actuator secured to the door leaf.

The actuator includes a frame which is mounted on the door leaf and a pinion which meshes with the rack. The pinion is driven by an electric motor.

Thus, the drive in rotation of the pinion makes it possible to drive the door leaf between its closed position and a partial opening position.

The opening system with rack and pinion described here is arranged in the vicinity of the front edge of the door leaf and of the hinge of the door leaf, so as not to obstruct access to the passenger compartment of the vehicle.

It is also known to provide an automated opening system with an electric cylinder, which includes an electric cylinder including a body mounted on the framework of the vehicle and a movable rod whose free end is mounted on the door leaf.

Thus, the cylinder is suitable for driving the door leaf between its closed position and its partial opening position.

The opening system with the cylinder described here is arranged in the vicinity of the front edge of the door leaf and the hinge of the door leaf, so as not to obstruct access to the passenger compartment of the vehicle. However, this type of handle has several drawbacks. One such drawback includes the handle not providing a solution to open the door leaf of the vehicle in the event of an electronic failure (i.e., the handle remains flush with the door leaf). In addition, the touch-type interface of such handle makes it possible to open the door leaf of the vehicle although not activated by a user.

SUMMARY

This section provides a general summary of the disclosure and is not a comprehensive disclosure of its full scope or all of its features.

The present disclosure provides a door leaf handle for a motor vehicle that includes a gripping element having an external surface facing the outside of the vehicle passenger compartment and an internal surface facing the inside of the vehicle passenger compartment. The gripping element is movable relative to a support and fixed to at least one lever configured to displace the gripping element. The gripping element is flush with the door leaf in a closed position. The handle further includes a detecting device configured to detect a pressure exerted on the gripping element and to send, when such pressure is detected, an opening signal of the door leaf to an opening device configured to open the door leaf. The detection device is disposed relative to the gripping element on the side of the internal surface of the gripping element. The pressure exerted on the gripping element by the user results in the opening signal being sent to the opening device. In this way, involuntarily opening of the door leaf is reduced or prevented.

In some forms, the detection device includes a button configured to be in contact (e.g., in abutment) with the gripping element when a predetermined pressure is exerted on the gripping element in an electronic opening zone of the external surface of the gripping element. An electric sensor is configured to generate the opening signal when displacing the button. The electric sensor therefore sends the opening signal of the door leaf only if a predetermined pressure is exerted on the gripping element. The button serves as an interface between the electric sensor and the gripping element and provides additional security as to the pressure to be exerted on the gripping element.

In another form, the gripping element is movable between the closed position and a deployed position in which it can be actuated manually by a user to then be displaced to an opening position of the door leaf to mechanically open the door leaf. The gripping element is displaced from the closed position to the deployed position by a pressure exerted by the user on a mechanical opening zone of the external surface of the gripping element. The mechanical and electronic opening zones being distinct. This makes it possible to mechanically open the door leaf. Thus, in the event of an electronic malfunction, accessibility to the vehicle is still possible.

In yet another form, separate opening zones are defined on the gripping element, thereby allowing the user to choose an electronic or mechanical opening of the door leaf.

In yet another form, the mechanical and electronic opening zones are located on the gripping element so that a pressure exerted on the electronic opening zone causes a displacement of the gripping element in a first direction and a pressure exerted on the mechanical opening zone causes a displacement of the gripping element in a second direction that is distinct from the first direction.

In yet another form, the movement of the gripping element, when a pressure is exerted on the mechanical or electronic opening zone, is a rotation. The second displacement direction being a reverse rotation of the first displacement direction.

In one form, the gripping element is connected to the support by means of a single lever to which it is in a pivot connection so that the gripping element is movable in rotation with respect to the lever. The electronic opening zone is offset from the pivot connection zone.

In another form, the gripping element is connected to the support by means of two levers. The gripping element is connected by a first pivot connection with the first lever and by a second pivot connection with the second lever.

In yet another form, a first lever includes an oblong hole and a second lever includes an orifice. The two levers are connected by at least one tie-rod. The tie-rod is parallel to the oblong hole. The tie-rod makes it possible to couple the two levers so that when the gripping element is displaced, the two levers are displaced according to the movement of the gripping element.

In yet another form, the first mechanical opening zone is disposed on the external surface of the gripping element disposed between the first pivot connection and the second pivot connection.

In yet another form, the second electronic opening zone is located opposite the first mechanical opening zone with respect to the position of the first pivot connection. As the two mechanical and electronic opening zones are distinct, the user therefore has the choice of mechanically or electronically opening the door leaf of the vehicle.

In one form, the electronic opening zone is disposed on an external face of the gripping element, on the side opposite to the support.

The present disclosure will be described in more detail through the different figures presented below, which will facilitate its understanding.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
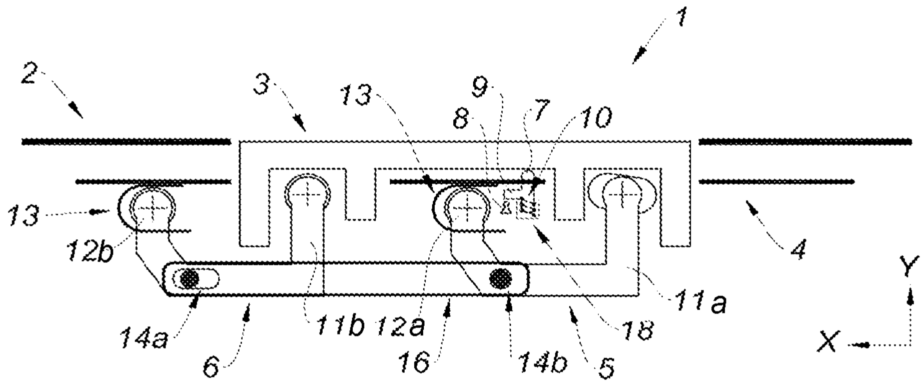
FIG. 1 is a cross-sectional view of a handle in a position flush with a door leaf in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a handle 1 in a position flush with a door leaf 2 of a motor vehicle for example. The flush position is a closed position of the handle 1. The handle 1 includes a gripping element 3. This gripping element 3 is flush with the door leaf 2. The handle 1 also includes a support 4 to which the gripping element 3 is connected, by means of two levers 5 and 6. These levers 5 and 6 are configured to displace the gripping element 3 in a rotary movement.

The handle 1 also includes a detection device 18 including of a button 7 and an electric sensor 8. The button 7 is in abutment against the gripping element 3 (i.e., the button is in contact with the gripping element 3), on an internal face of the gripping element 3, on the side of the support 4. The button 7 includes an arm 9 disposed parallel to the door leaf 2.

The button 7 is received and held by the support 4 and has a compression spring 10 configured to return the button 7 to an initial position of abutment against the gripping element 3 when the button 7 is compressed.

The electric sensor 8 is disposed under the arm 9 of the button 7. That is, the electronic sensor 8 is on the same axis as the arm 9 along a transverse axis Y, so that the arm 9 can come into contact with the electric sensor 8.

Lever 5 has a first portion 11*a* and a second portion 12*a*. Lever 6 has a first portion 11*b* and a second portion 12*b*. The first portions 11*a*, 11*b* of the levers 5, 6, respectively, are fixed to the gripping element 3 by a pivot connection and the second portions 12*a*, 12*b* of the levers 5, 6, respectively, are fixed to the support 4. Each second portion 12*a*, 12*b* is in a pivot connection between the support 4 and the gripping element 3 and includes a torsion spring 13. The levers 5, 6 have a bent shape.

The first portion 11*a* of the first lever 5 is connected to a support zone situated facing the gripping element 3. The first portion 11*b* of the second lever 6 is linked to a support zone offset from the gripping element 3.

A tie-rod 16 couples the two levers 5, 6. This coupling is made at the ends of the tie-rod 16.

Each end of the tie-rod 16 is in an articulated connection with a corresponding lever 5, 6. One of the articulated connections has an oblong hole 14*a* disposed parallel to the tie-rod 16.

The tie-rod 16 makes it possible to displace the levers 5, 6 relative to each other in accordance with the displacement of the gripping element 3.

The oblong hole 14*a* thus gives the tie-rod 16 a clearance in a longitudinal direction of the tie-rod.

The forces transmitted by the tie-rod are therefore exerted in a balanced manner both on the lever 6 and on the lever 5 so that the risk of jamming is reduced.

Figure 2:
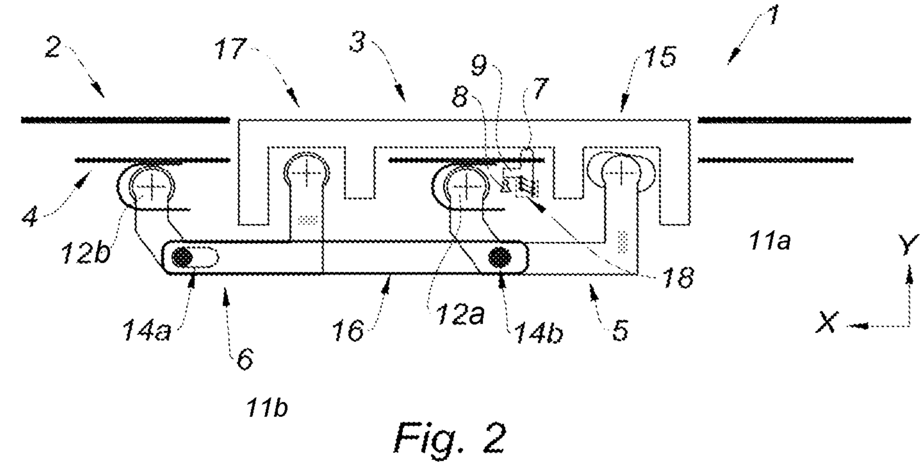
FIG. 2 is a cross-sectional view of the handle of FIG. 1 in an electronic opening position.

FIG. 2 shows the handle 1 whose gripping element 3 is no longer in a flush position vis-à-vis the door leaf 2. The gripping element 3 is slightly inclined relative to the door leaf 2. As a result, the arm 9 of the button 7 bears against the electric sensor 8. The compression spring 10 is compressed against the support 4 receiving the button 7.

The gripping element 3 has performed a rotary movement towards the interior of the vehicle passenger compartment, by means of the second portion 12*b* of the lever 6. This displacement of the gripping element 3 is due to a pressure exerted on an electronic opening zone 15 disposed on the external face of the gripping element 3. That is, this electronic opening zone 15 is located downstream from the axis of rotation along the longitudinal axis X of the handle 1 of the second portion 12*a* of the lever 5.

Figure 3:
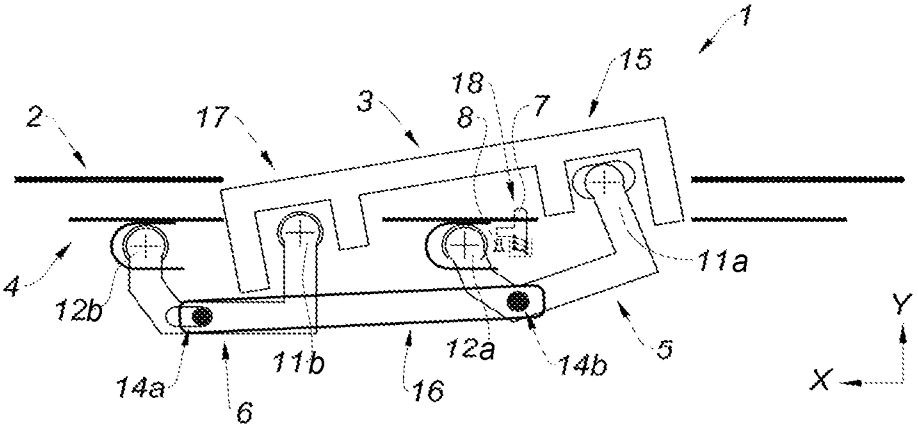
FIG. 3 is a cross-sectional view of the handle of FIG. 1 in a deployed position.

FIG. 3 shows the handle 1 in the deployed position. The deployed position is reached in the direction opposite to the position of the handle 1 shown in FIG. 2. It should be understood that the mechanical opening zone 17 to displace the gripping element 3 in the deployed position is different. The mechanical opening zone 17 is disposed upstream of the axis of rotation along the longitudinal axis X of the handle 1 of the second portion 12*a* of the lever 5. Stated differently, the mechanical opening zone 17 is located between the two pivot connections of the levers 5, 6, namely between the second portions 12*a*, 12*b* of each lever 5 and 6.

The electronic opening zone 15 is located opposite the mechanical opening zone 17.

The deployed position is configured to give access to a lock (not shown) allowing the motor vehicle to be unlocked when the latter is in power failure.

Figure 4:
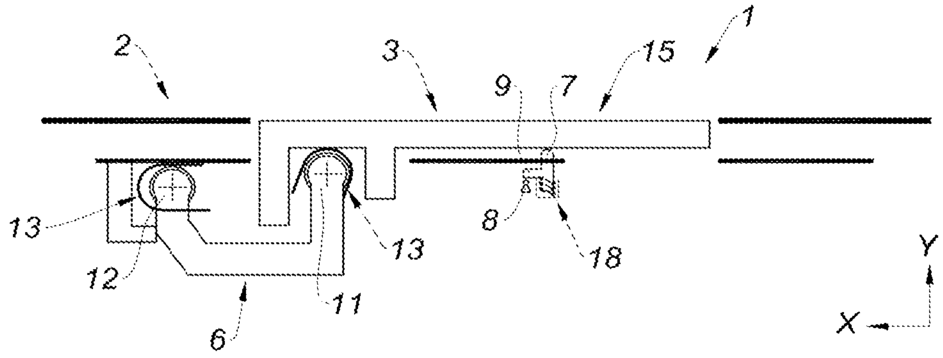
FIG. 4 is a cross-sectional view of another handle in a position flush with a door leaf in accordance with the present disclosure.
Figure 5:
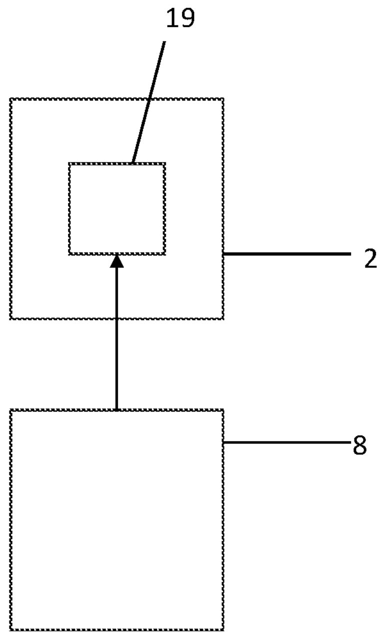
FIG. 5 is a block diagram illustrating components of the door leaf of FIG. 1.

FIG. 4 shows a handle 1 according to a second form of the present disclosure. The handle 1 includes a single lever 6. Consequently, the handle 1 is not configured to adopt a deployed position. The first portion 11 and the second portion 12 of the lever 6 include a torsion spring 13. The lever 6 does not include a tie-rod 16.

The electronic opening zone 15 is therefore located between the first portion 11 of the lever 6 and one end of the gripping element 3 furthest from the lever 6. This second form does not include a mechanical opening zone.

The two forms represented in the figures have rotatably movable handles. According to another non-represented form, the handle can be movable in translation.

In the following paragraphs, the operation of the present disclosure is explained, first with reference to the first form (FIGS. 1-3).

When the handle 1 is in a position flush with the door leaf 2 of the motor vehicle, the detection device 18 is in contact and in abutment against the gripping element 3.

A user can exert pressure in the electronic opening zone 15 of the gripping element, in order to displace the gripping element 3 so that the gripping element 3 displaces the button 7, which in turn, comes into contact with the electric sensor 8 via its arm 9.

The electric sensor 8, when the latter detects a pressure exerted in the electronic opening zone 15 of the gripping element 3, sends an opening signal of the door leaf 2 to an opening device 19 of the door leaf 2.

This opening device 19 makes it possible to open the door leaf 2 of the vehicle, for example by a door leaf ejection system.

It should be noted that the opening device 19 can also lower a window of the door leaf 2.

When the motor vehicle has experienced an electrical malfunction, the door leaf 2 cannot be opened by the device presented above.

To remedy this, the user exerts pressure on the mechanical opening zone 17 of the gripping element 3, displacing the gripping element 3 into a deployed position.

This deployed position allows access to the lock of the door leaf 2, allowing the user to unlock the door leaf 2 using a suitable key.

Once the door leaf 2 is unlocked, the user manually pulls on the gripping element 3 to drive the gripping element 3 into the opening position of the door leaf 2.

According to the second form shown in FIG. 4, the handle does not have an opening mode by pressing on the mechanical opening zone.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handle assembly of a door leaf for a motor vehicle comprising:

a gripping element including an external surface facing outside of a vehicle passenger compartment and an internal surface facing toward an inside of the vehicle passenger compartment, the gripping element being movable relative to a support and fixed to at least one lever configured to displace the gripping element, the gripping element being flush with the door leaf in a closed position; and a detection device configured to detect a predetermined pressure exerted on the gripping element and to send, when such predetermined pressure is detected, an opening signal of the door leaf to an opening device configured to open the door leaf, the detection device being disposed relative to the gripping element on the internal surface of the gripping element;

wherein the detection device includes:

a button configured to be in contact with the gripping element when the predetermined pressure is exerted on an electronic opening zone of the external surface of the gripping element; and an electric sensor configured to generate the opening signal during a displacement of the button, wherein the gripping element is movable between the closed position and a deployed position in which the gripping element is configured to be displaced by a user from the deployed position to an opening position, wherein displacement of the gripping element from the deployed position to the opening position mechanically opens the door leaf, wherein the gripping element is displaced from the closed position to the deployed position by detection of a second predetermined pressure applied at a mechanical opening zone of the external surface of the gripping element, the mechanical opening zone being distinct from the electronic opening zone, and wherein the gripping element is connected to the support via a first lever and a second lever, the gripping element being connected by a first pivot connection with the first lever and by a second pivot connection with the second lever.

2. The handle assembly according to claim 1, wherein the mechanical opening zone and the electronic opening zone are located on the gripping element so that the predetermined pressure exerted on the electronic opening zone causes a displacement of the gripping element in a first direction and the second predetermined pressure exerted on the mechanical opening zone causes a displacement of the gripping element in a second direction distinct from the first direction.

3. The handle assembly according to claim 2, wherein, the gripping element is configured to rotate in a first rotational direction in response to the predetermined pressure being exerted on the electronic opening zone such that the displacement of the gripping element in the first direction includes rotation of the gripping element in the first rotational direction, and wherein the gripping element is configured to rotate in a second rotational direction in response to the second predetermined pressure being exerted on the mechanical opening zone such that the displacement of the gripping element in the second direction includes rotation of the gripping element in the second rotational direction, the second rotational direction being opposite the first rotational direction.

4. The handle assembly according to claim 1, wherein the mechanical opening zone is disposed on the external surface of the gripping element disposed between the first pivot connection and the second pivot connection.

5. The handle assembly according to claim 1, wherein the first lever includes an oblong hole and the second lever includes an orifice, the first and second levers being connected by at least one tie-rod that is parallel to the oblong hole.

6. The handle assembly according to claim 1, wherein the electronic opening zone is located opposite the mechanical opening zone relative to the first pivot connection.

7. The handle assembly according to claim 1, wherein the electronic opening zone is disposed at the external surface of the gripping element opposite to the support.

* * * * *